(12) United States Patent
Park et al.

(10) Patent No.: US 12,470,359 B2
(45) Date of Patent: *Nov. 11, 2025

(54) APPARATUS AND METHOD FOR MANAGING INTERFERENCE IN WIRELESS COMMUNICATION SYSTEM

(71) Applicant: Samsung Electronics Co., Ltd., Suwon-si (KR)

(72) Inventors: Sangkyu Park, Seoul (KR); Gyouhwan Kim, Suwon-si (KR); Jai-Jin Lim, Seoul (KR); Jaeho Jeon, Seoul (KR); Youngkyu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 18/499,662

(22) Filed: Nov. 1, 2023

(65) Prior Publication Data
US 2024/0063993 A1 Feb. 22, 2024

Related U.S. Application Data

(63) Continuation of application No. 17/716,508, filed on Apr. 8, 2022, now Pat. No. 11,838,245, which is a
(Continued)

(30) Foreign Application Priority Data

May 26, 2017 (KR) .................... 10-2017-0065441

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/0048* (2013.01); *H04L 5/0053* (2013.01);
(Continued)

(58) Field of Classification Search
CPC ....... H04L 5/14; H04L 5/0053; H04L 5/0073; H04L 5/1469; H04L 5/0048; H04W 72/0446; H04W 76/27; H04W 72/0406
See application file for complete search history.

(56) References Cited

U.S. PATENT DOCUMENTS

2009/0257396 A1  10/2009  Eliezer et al.
2013/0223299 A1* 8/2013  Yang .................... H04L 1/1685
                                                              370/280
(Continued)

OTHER PUBLICATIONS

Lee, Samsung LTE RAN Package 6.0.0_P1 Release Note, Document Version 1.0, Sep. 2016, SIRP-DE0416001.
(Continued)

*Primary Examiner* — Dady Chery
(74) *Attorney, Agent, or Firm* — Jefferson IP Law, LLP

(57) ABSTRACT

An apparatus of a base station in a wireless communication system supporting time division duplex (TDD) and a method thereof are provided. The apparatus includes at least one transceiver, and at least one processor operatively connected with the at least one transceiver. The at least one processor may be configured to perform signaling for preventing transmission of an uplink (UL) signal in a cell, and measure a strength of a downlink (DL) signal received from at least one base station during at least one symbol in a UL subframe. The apparatus relates to a pre-5th-Generation (5G) or 5G communication system to be provided for supporting higher data rates beyond 4th-Generation (4G) communication system such as Long-Term Evolution (LTE).

20 Claims, 8 Drawing Sheets

Related U.S. Application Data continuation of application No. 16/840,979, filed on Apr. 6, 2020, now Pat. No. 11,444,744, which is a continuation of application No. 15/991,562, filed on May 29, 2018, now Pat. No. 10,615,948.

(51) Int. Cl.
    *H04W 72/0446*    (2023.01)
    *H04W 72/20*    (2023.01)
    *H04W 76/27*    (2018.01)
    *H04W 48/12*    (2009.01)

(52) U.S. Cl.
    CPC .......... *H04L 5/0073* (2013.01); *H04L 5/1469* (2013.01); *H04W 72/0446* (2013.01); *H04W 72/20* (2023.01); *H04W 76/27* (2018.02); *H04W 48/12* (2013.01)

(56) References Cited

U.S. PATENT DOCUMENTS

| | | |
|---|---|---|
| 2013/0286902 A1 | 10/2013 | Chen et al. |
| 2016/0080133 A1 | 3/2016 | Golitschek Edler Von Elbwart et al. |
| 2018/0323887 A1* | 11/2018 | Azarian Yazdi ...... H04L 5/0007 |

OTHER PUBLICATIONS

Labib et al., "Enhancing the Robustness of LTE Systems: Analysis and Evolution of the Cell Selection Process", Feb. 2017.
Gao et al., "Service- and interference-aware dynamic TDD design in 5G ultra-dense network scenario".
Korean Office Action dated Feb. 24, 2021, issued in Korean Application No. 10-2017-0065441.
Korean Notice of Patent Grant dated Aug. 17, 2021, issued in Korean Application No. KR10-2017-0065441.

* cited by examiner

APPARATUS AND METHOD FOR MANAGING INTERFERENCE IN WIRELESS COMMUNICATION SYSTEM

CROSS-REFERENCE TO RELATED APPLICATION(S)

This application is a continuation application of prior application Ser. No. 17/716,508, filed on Apr. 8, 2022, which is a continuation application of prior application Ser. No. 16/840,979, filed on Apr. 6, 2020, which has issued as U.S. Pat. No. 11,444,744 on Sep. 13, 2022, which is a continuation of U.S. patent application Ser. No. 15/991,562, filed on May 29, 2018, which has issued as U.S. Pat. No. 10,615,948 on Apr. 7, 2020, and which was based on and claims priority under 35 U.S.C. § 119(a) of a Korean patent application number 10-2017-0065441, filed on May 26, 2017, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for managing interference in a time division duplex (TDD) wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time division duplex (TDD) communication system supports downlink communication and uplink communication between a base station and a terminal using different time resources. In the TDD communication system, a guard period (GP) is adopted in a special subframe (SSF) for a switch between downlink transmission and uplink transmission. Meanwhile, a signal transmitted by a cell distant from a cell is transmitted for a long time and thus may be received in an uplink subframe for another cell beyond a GP, and the received signal may act as interference with the other cell. In the TDD communication system, such interference may degrade the quality of uplink communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively measuring interference in a wireless communication system.

Additional aspects will be set forth in part in the description which follows and, in part, will be apparent from the description, or may be learned by practice of the presented embodiments.

Also, the present disclosure provides an apparatus and a method for measuring downlink-to-uplink (DL-to-UL) interference due to the propagation delay of another cell in a wireless communication system.

Further, the present disclosure provides an apparatus and a method for controlling interference caused by another cell in a wireless communication system.

In addition, the present disclosure provides an apparatus and a method for adjusting a guard period according to the amount of interference from another cell in a wireless communication system.

In accordance with an aspect of the disclosure, an apparatus of a base station in a wireless communication system supporting time division duplex (TDD) is provided. The apparatus includes at least one transceiver, and at least one processor operatively connected with the at least one transceiver. The at least one processor may be configured to perform signaling for preventing transmission of an uplink (UL) signal in a cell, and measure a strength of a downlink (DL) signal received from at least one base station during at least one symbol in a UL subframe.

In accordance with an aspect of the disclosure, an operation method of a base station in a wireless communication system supporting time division duplex (TDD) is provided. The operation method includes performing signaling for preventing transmission of an uplink (UL) signal in a cell, and measuring a strength of a downlink (DL) signal received from at least one base station during at least one symbol in a UL subframe.

An apparatus and a method according to various embodiments of the disclosure may measure and alleviate interference according to a desired schedule/period, thereby adaptively dealing with the effect of interference.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
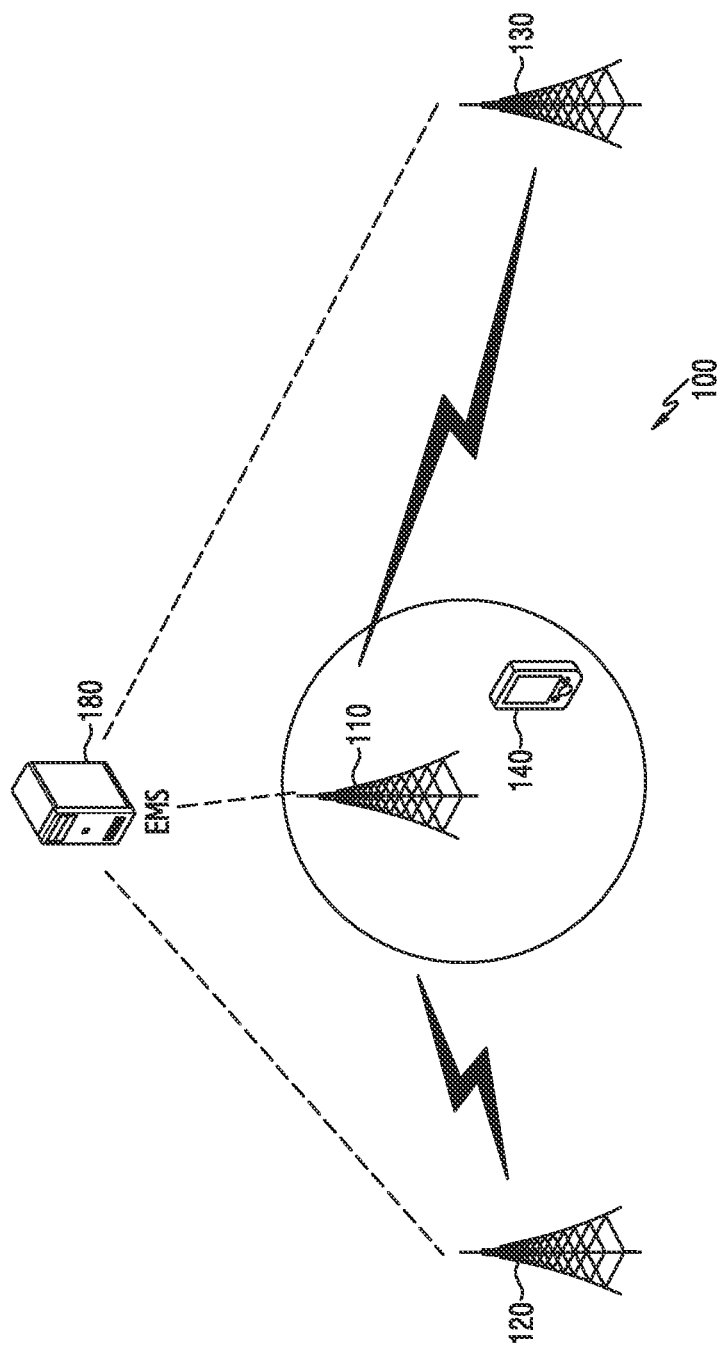
FIG. 1A illustrates a communication environment in a wireless communication system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software and thus, the various embodiments of the disclosure may not exclude the perspective of software.

Herein, the terms, such as "A or B," or "at least one of A and/or B," may include all possible combinations of items listed with the terms. The expression "a first," "a second," "the first," or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The expression "configured to" as used in various embodiments of the disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The disclosure relates to an apparatus and a method for managing interference in a wireless communication system that supports a time division duplex (TDD) communication mode. Specifically, the disclosure illustrates operations for providing high-quality communication by measuring inter-cell interference that affects an uplink subframe and controlling the interference in a TDD communication system.

As used herein, a term for referring to control information, a term for an operation state (e.g., operation, or procedure), a term for referring to data (e.g., information, value, or command), a term for referring to network entities (e.g., base station, digital unit (DU), radio unit (RU), or element management system (EMS), a term for referring to messages (e.g., signal, data, triggering, or notification), a term for referring to a component of an apparatus, and the like are illustrated for convenience of explanation. Therefore, the disclosure is not limited by the following terms, and other terms having equivalent technical meanings may be used.

Further, although the disclosure illustrates various embodiments using terms used in some communication standards (e.g., long-term evolution (LTE) and LTE-advanced (LTE-A) systems), these standards are provided merely for convenience of description. Various embodiments of the disclosure may be easily modified and applied to other communication systems. In addition, although the disclosure illustrates a downlink as an example for convenience of explanation, the apparatus and the method according to various embodiments of the disclosure are also applicable to an uplink.

FIG. 1A illustrates a wireless communication environment 100 according to various embodiments of the disclosure. Hereinafter, the term 'cell' used herein may refer to the service coverage area of a base station. A base station may cover one cell or may cover a plurality of cells. Here, a plurality of cells may be classified according to a supported frequency or an area covering a sector. In the following description, a base station may be used as a term including a cell, or a cell may be used to refer to a base station. A serving cell is a cell that provides higher-layer signaling (e.g., radio resource control (RRC) signaling) with a terminal and may refer to one cell or a plurality of cells.

Referring to FIG. 1A, the wireless communication environment 100 may include a first base station 110, a second base station 120, a third base station 130, and a terminal 140. In the following description of the disclosure, for convenience of explanation, the first base station 110 is described as an entity that measures interference (hereinafter, referred to as a measuring base station), and the second base station 120 and the third base station 130 are described as an entity that generates interference (hereinafter, referred to as an interfering candidate base station), but the disclosure is not limited thereto. That is, the second base station 120 may measure a signal transmitted from the first base station 110 as interference.

The first base station 110 is a network infrastructure that provides wireless access for a terminal in coverage. The coverage may be defined as a certain geographic area based on a distance over which the first base station 110 can transmit a signal. The first base station 110 may provide a service to terminals (e.g., a terminal 140) within the range of a cell. The first base station 110 may be referred to as an access point (AP), an evolved NodeB (eNB), a 5th-Generation (5G) node, a 5G NodeB (NB), a wireless point, a transmission/reception point (TRP), a digital unit (DU), a radio unit (RU), a remote radio head (RRH), or other terms with equivalent technical meanings in addition to a base station. The first base station 110 may communicate with at least one terminal in the coverage.

Although a description of a base station is made with reference to the first base station 110, such a description may also be applied to the second base station 120 and the third base station 130. The second base station 120 is located relatively closer to the first base station 110 than the third base station 130. For example, the second base station 120 may be located about 60 km distant from the first base station 110, and the third base station 130 may be located about 140 km distant from the first base station 110.

The terminal 140 is a device used by a user and communicates with the first base station 110 through a wireless channel. In some cases, at least one terminal 140 may be operated without a user's involvement. For example, the terminal 140 may be a device performing machine-type communication (MTC) and may not be carried by a user. The terminal 140 may be referred to as user equipment (UE), a mobile station, a subscriber station, a remote terminal, a wireless terminal, an electronic device, a user device, or other terms with equivalent technical meanings in addition to a terminal A terminal (e.g., the terminal 140) according to various embodiments of the disclosure may include at least one of, for example, a smartphone, a tablet PC, a mobile phone, a video phone, an electronic book reader, a desktop PC, a laptop PC, a netbook computer, a workstation, a server, a personal digital assistant (PDA), a portable multimedia player (PMP), an moving picture experts group phase 1 or phase 2 (MPEG-1 or MPEG-2) audio layer 3 (MP3) player, a medical device, a camera, and a wearable device.

An element management system (EMS) 180 may control at least one of the first base station 110, the second base station 120, and the third base station 130. Here, the EMS is a system for maintaining efficiency and consistency in the management of network elements (NEs). The EMS 180 may control, as an NE, the first base station 110, the second base station 120, and the third base station 130. Although FIG. 1A shows the EMS 180 as a separate entity from the first base station 110, the second base station 120, or the third base station 130, the EMS 180 may be included in at least one of the first base station 110, the second base station 120, and the third base stations 130. The EMS 180 may perform, for preliminary setup of various embodiments of the disclosure, setup of uplink (UL)/downlink (DL) configurations of each of the first base station 110, the second base station 120, and the third base station 130, setup of special subframe (SSF) configurations, triggering of interference measurement and interference control, and setup of initial parameters, which will be described.

The wireless communication environment 100 may be a wireless environment supporting a TDD system. In the wireless communication environment 100, UL transmission and DL transmission may be separated by time according to a TDD communication mode. Hereinafter, a resource structure for a TDD communication mode will be described. A TDD frame may include a UL subframe for UL transmission and a DL subframe for DL transmission. The frame may include a special subframe (SSF) for switching from DL transmission to UL transmission. Here, a combination of a UL subframe, a DL subframe, and a special subframe included in one frame is referred to as a UL/DL configuration. Another UL/DL configuration refers to another combination of a UL subframe, a DL subframe, and a special subframe in one frame. For example, UL/DL configuration #2 may include six DL subframes, two UL subframes, and two special subframes, and UL/DL configuration #5 may include eight DL subframes, one UL subframe, and one special subframe. In some embodiments of the disclosure, the wireless communication environment 100 may support an LTE-TDD communication system. Here, the UL/DL configuration may be established as in Table 1 below. In Table 1, D denotes a DL subframe, S denotes a special subframe, and U denotes a UL subframe.

TABLE 1

| UL/DL configu-ration | Subframe number | | | | | | | | | | Number of subframes | | |
|---|---|---|---|---|---|---|---|---|---|---|---|---|---|
| | 0 | 1 | 2 | 3 | 4 | 5 | 6 | 7 | 8 | 9 | DL | UL | S |
| 0 | D | S | U | U | U | D | S | U | U | U | 2 | 6 | 2 |
| 1 | D | S | U | U | D | D | S | U | U | D | 4 | 4 | 2 |
| 2 | D | S | U | D | D | D | S | U | D | D | 6 | 2 | 2 |
| 3 | D | S | U | U | U | D | D | D | D | D | 6 | 3 | 1 |
| 4 | D | S | U | U | D | D | D | D | D | D | 7 | 2 | 1 |
| 5 | D | S | U | D | D | D | D | D | D | D | 8 | 1 | 1 |
| 6 | D | S | U | U | U | D | S | U | U | D | 3 | 5 | 2 |

To avoid severe interference between a downlink and an uplink between cells, neighboring cells may have the same UL/DL configuration. Hereinafter, it is assumed that the same UL/DL configuration is set for illustrated base stations (e.g., the first base station 110, the second base station 120, and the third base station 130).

In a TDD system, since the same carrier frequency is used for UL transmission and DL transmission, a DL-UL switch may be required for a base station and a terminal A TDD frame may include a special subframe for such a switch. The special subframe may include a downlink pilot time slot (DwPTS), a guard period (GP), and an uplink pilot time slot (UpPTS). The DwPTS is a period for a DL resource in the special subframe and may be used for transmission of a Physical downlink shared channel (PDSCH). The UpPTS is a period for a UL resource in the special subframe and may be used for transmission of a sounding reference signal (SRS) or a physical random access channel (PRACH). The GP is a period in which neither DL transmission nor UL transmission occurs and may be required for a DL-UL switch. A GP may be a period disposed between a DwPTS and a UpPTS within one special subframe (e.g., 1 ms). Here, a combination of a DwPTS, a GP, and a UpPTS included in one special subframe is referred to as a special subframe configuration (SSF configuration). Another SSF configuration denotes another combination including a length of DwPTS, a length of GP, and a length of UpPTS in one frame. For example, UL/DL configuration #5 denotes a combination in which a DwPTS occupies three symbols, a GP occupies nine symbols, and a UpPTS occupies two symbols. UL/DL configuration #7 denotes a combination in which a DwPTS occupies ten symbols, a GP occupies two symbols, and a UpPTS occupies two symbols. In some embodiments of the disclosure, when the wireless communication environment 100 supports an LTE-TDD communication system, the SSF configuration may be established as in Table 2 below.

TABLE 2

| SSF configuration | Symbol number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | | | Dw | | | | GP | | | | | | | Up |
| 1 | | | | | Dw | | | | | | GP | | | Up |
| 2 | | | | | Dw | | | | | | | GP | | Up |
| 3 | | | | | | Dw | | | | | | | GP | Up |
| 4 | | | | | | Dw | | | | | | | GP | Up |
| 5 | | | Dw | | | | GP | | | | | | | Up |
| 6 | | | | | Dw | | | | | | GP | | | Up |
| 7 | | | | | Dw | | | | | | | GP | | Up |
| 8 | | | | | Dw | | | | | | | GP | | Up |
| 9 | | | | Dw | | | | | | GP | | | | Up |

A DL signal transmitted from a neighboring cell may be introduced after a DwPTS period of another cell due to a propagation delay. Therefore, the length of a GP needs to be allocated by a base station so that UL transmission and DL transmission do not interfere with each other. Specifically, as the length of a GP becomes longer, the length of a DwPTS becomes shorter, or the length of a UpPTS becomes shorter, a period in which neither DL transmission nor UL transmission occurs becomes longer, making it easy to avoid interference.

Figure 1B:
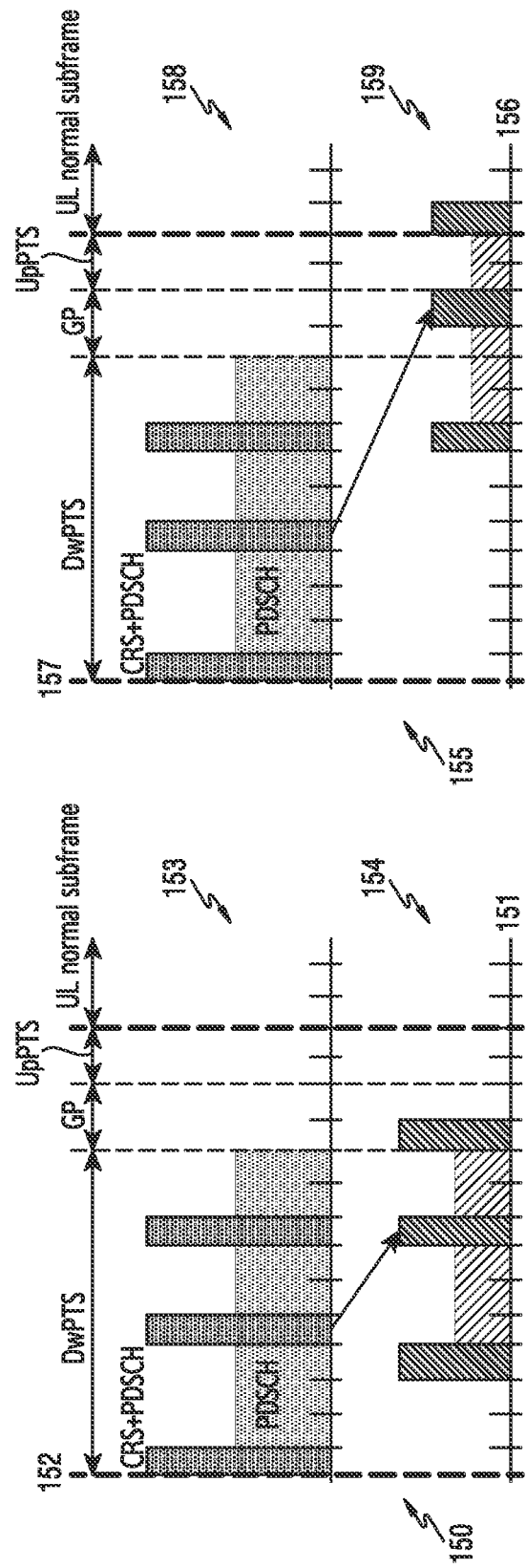
FIG. 1B illustrates an example of time of flight (TOF) interference in a wireless communication system according to various embodiments of the disclosure.

FIG. 1B illustrates an example of TOF interference according to various embodiments of the disclosure.

Referring to FIG. 1B, a graph 150 shows a result that the first base station 110 receives and measures a first DL signal transmitted from the second base station 120 of FIG. 1A. A graph 155 shows a result that the first base station 110 receives and measures a second DL signal transmitted from the third base station 130 of FIG. 1A. Although not being a terminal connected to the second base station 120 or the third base station 130, the first base station 110 may receive the first DL signal and the second DL signal due to the spread of radio waves. Here, SSF configuration #7 (DwPT: ten symbols, GP: two symbols, UpPTS: two symbols) is set for all of the first base station 110, the second base station 120, and the third base station 130. In addition, as described above, the second base station 120 is located closer to the first base station 110 than the third base station 130.

Referring to the graph 150, a horizontal axis 151 denotes a symbol and a vertical axis 152 denotes signal strength. An area 153 denotes a transmission state at the second base station 120 transmitting the first DL signal, and an area 154 denotes a reception state at the first base station 110 receiving the first DL signal. The first DL signal transmitted from the second base station 120 over a DwPTS is transmitted to the first base station 110 over a propagation delay corresponding to three symbols. A portion of the first DL signal transmitted on the eighth symbol for the second base station 120 is received on the 11th symbol at the first base station 110. Although the 11th symbol is not a DwPTS, the portion arrives within a GP and thus does not act as interference with the first base station 110.

Referring to the graph 155, a horizontal axis 156 denotes a symbol and a vertical axis 157 denotes signal strength. An area 158 denotes a transmission state at the third base station 130 transmitting the second DL signal, and an area 159 denotes a reception state at the first base station 110 receiving the second DL signal. The second DL signal transmitted from the third base station 130 over a DwPTS is transmitted to the first base station 110 over a propagation delay corresponding to seven symbols. A portion of the second DL signal transmitted on the eighth symbol for the third base station 130 is received on the first symbol of a next subframe, which is a UL subframe, at the first base station 110. The second DL signal of the third base station 130 is introduced into the UL subframe of the first base station 110, which is another cell, so that the part of the second DL signal may act as interference with the first base station 110. That is, the first base station 110 may receive the second DL signal as an interference signal. Interference by symbols introduced into a UL subframe beyond a special subframe due to the propagation delay of a remote cell may be referred to as time of flight (TOF) interference, remote cell interference, propagation delay interference, or self-interference. In the disclosure, such interference is referred to as TOF interference.

When a DL signal from a different cell is introduced into a resource region for a UL signal, the UL signal transmitted at relatively low output may be vulnerable to interference (TOF interference) by the DL signal. Therefore, a method for measuring and controlling TOF interference, that is, a method for managing TOF interference, is required. Hereinafter, the configuration of a base station for managing TOF interference according to various embodiments of the disclosure is described with reference to FIG. 2.

Figure 2:
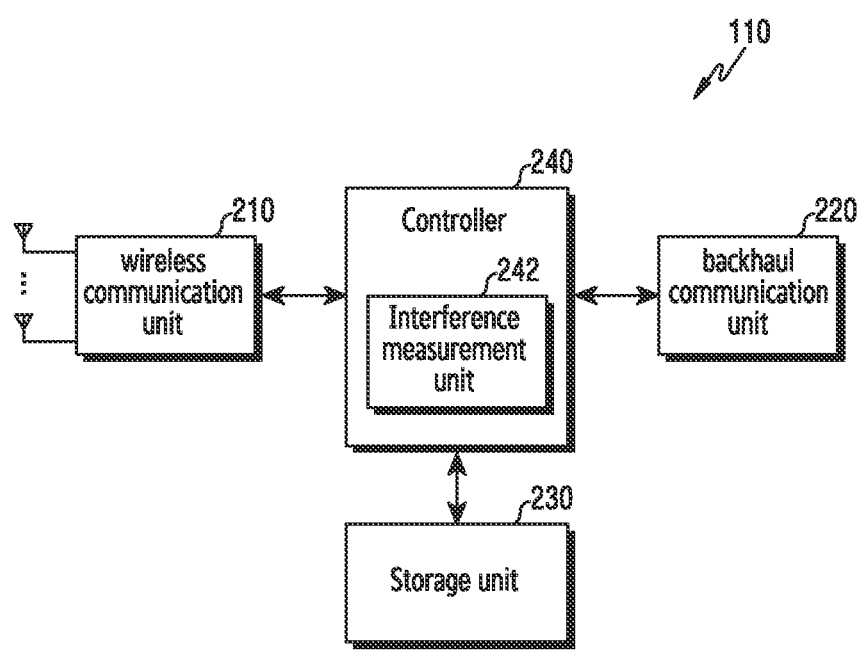
FIG. 2 illustrates the configuration of a base station in a wireless communication system according to various embodiments of the disclosure.

FIG. 2 illustrates the configuration of a base station according to various embodiments of the disclosure. The configuration illustrated in FIG. 2 may be construed as the configuration of the first base station 110, the second base station 120, or the third base station 130 in FIG. 1A. The terms 'unit,' '-or/er,' and the like used herein indicate a unit for processing at least one function or operation, which may be implemented by hardware, software, or a combination thereof. For convenience of explanation, operations are described with reference to the first base station 110, but the described operation may also be applied to other base stations (the second base station 120 and the third base station 130). Also, although the first base station 110 is described as including a function of an EMS (e.g., the EMS 180 of FIG. 1A) that controls other NEs, the EMS may be configured as a separate entity.

Referring to FIG. 2, the first base station 110 may include a wireless communication unit 210 (e.g., a wireless communication device), a backhaul communication unit 220 (e.g., a backhaul communication device), a storage unit 230 (e.g., a storage), and a controller 240 (e.g., at least one processor).

The wireless communication unit 210 may perform functions for transmitting or receiving a signal through a wireless channel in a wireless communication environment. For example, the wireless communication unit 210 may perform a function of converting between a baseband signal and a bit stream according to the physical layer specification of a system. For example, in control information transmission, the wireless communication unit 210 may encode and modulate a transmitted bit stream to generate complex symbols. Further, in data reception, the wireless communication unit 210 may demodulate and decode a baseband signal to reconstruct a received bit stream. The wireless communication unit 210 may upconvert a baseband signal into a RF band signal and may transmit the RF band signal through an antenna. The wireless communication unit 210 may downconvert a RF band signal, received through the antenna, into a baseband signal. To this end, the wireless communication unit 210 may include a transmission filter, a reception filter, an amplifier, a mixer, an oscillator, a digital-to-analog converter (DAC), an analog-to-digital converter (ADC), or the like.

As described above, the wireless communication unit 210 transmits and receives a signal. Accordingly, the wireless communication unit 210 may be referred to as a transmitter, a receiver, or a transceiver. In the following description, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the first base station 110 to another node, for example, another access node, another base station (e.g., the second base station 120), a higher node, a core network, or the like, into a physical signal, and converts a physical signal, which is received from another node, into a bit stream. The first base station 110 may perform signaling with another base station, that is, the second base station 120 or the third base station 130, through the backhaul communication unit.

The storage unit 230 may store data, such as a basic program, an application program, and setting information, for the operation of the first base station 110. The storage unit 230 may be configured as a volatile memory, a nonvolatile memory, or a combination of a volatile memory and a nonvolatile memory. The storage unit 230 provides the stored data by request from the controller 240.

According to various embodiments of the disclosure, the storage unit 230 may store preset parameters for a measurement operation. For example, the storage unit 230 may store a period in which the measurement operation is performed, duration for which the measurement operation is performed, and setting information on base stations for performing the measurement operation. In addition, the storage unit 230 may store the value of the strength of a DL signal received from at least one base station (e.g., the second base station 120 or the third base station 130) per symbol. When the EMS 180 is configured as an entity separate from the first base station 110, the preset parameters may be stored in a storage unit of the EMS 180.

The controller 240 may control the overall operations of the first base station 110. For example, the controller 240 may transmit and receive a signal through the wireless communication unit 210 and the backhaul communication unit 220. Further, the controller 240 may record and read data in the storage unit 230. To this end, the controller 240 may include at least one processor or microprocessor or may be configured as a part of a processor.

The controller 240 may preset parameters for measurement of TOF interference according to various embodiments described below. Also, the controller 240 may measure the reception strength of a DL signal from an interfering base station and may compile statistics from measurement results. The controller 240 may include an interference measurement unit 242 that performs the measurement and compiles statistics from measurement results. Here, the interference measurement unit 242 may be, as an instruction set or code stored in the storage unit 230, an instruction/code at least temporarily residing in the controller 240 or a storage space that stores an instruction/code, or may be part of circuitry forming the controller 240. The interference measurement unit 242 may perform an operation of dividing measurement results by symbols or calculating a representative value (e.g., average value) of the strength of a received signal on a particular symbol. Further, the controller 240 may perform an operation for controlling measured interference. In addition, the controller 240 may control the first base station 110 to perform operations according to various embodiments described below.

Hereinafter, specific operations for measuring TOF interference described above are described with reference to FIGS. 3 and 4.

TOF Interference Measurement

Figure 3:
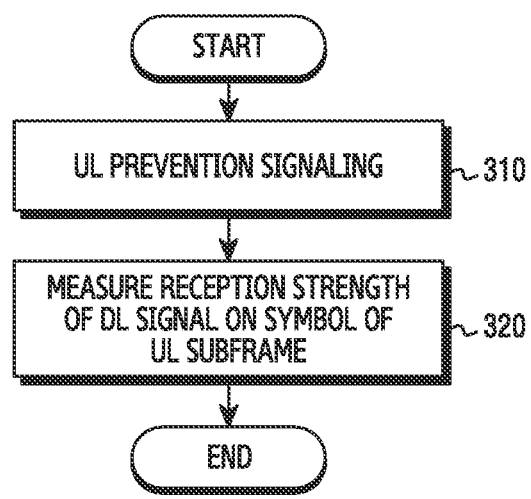
FIG. 3 illustrates the flow of an interference measurement operation by a base station in a wireless communication system according to various embodiments of the disclosure.

FIG. 3 illustrates the flow of an interference measurement operation by a base station according to various embodiments of the disclosure. The base station may be the first base station 110 of FIG. 1A.

Although not shown in FIG. 3, the interference measurement operation may be triggered by an EMS. When the base station of FIG. 1A is configured to include an EMS function, the first base station 110 may start the interference measurement operation according to an on-demand setting or a predetermined setting of a network operator. For example, when it is identified that the intensity of measured TOF interference instantaneously increases on the basis of the statistics of received signal strength measured for each symbol, the interference measurement operation may be started. When the EMS is configured as an entity separate from the first base station 110 (e.g., the EMS 180), the first base station 110 may receive a triggering message including information about presetting from the EMS.

Referring to FIG. 3, in operation 310, the first base station 110 may perform UL prevention signaling. Here, UL prevention signaling is defined as signaling for preventing UL signal transmission from a terminal That is, the first base station 110 may prevent UL transmission (e.g., physical uplink shared channel (PUSCH) transmission and physical uplink control channel (PUCCH) transmission) by another terminal in order to accurately measure TOF interference. By preventing the transmission of the UL signal in the UL subframe, the measurement for the DL signal in the UL subframe can be performed more accurately First, the first base station 110 may perform a cell barring operation in order to prevent in advance terminals from being connected to the first base station 110. The first base station 110 may generate system information including information indicating that connection to the first base station 110 is barred. The first base station 110 may broadcast the generated system information. Accordingly, a terminal receiving the system information may not attempt connection to the first base station 110. The first base station 110 may prevent in advance UL signal transmission by a new terminal.

Further, the first base station 110 may forcibly hand over terminals RRC-connected to the first base station 110. The first base station 110 may hand over terminals RRC-connected with a carrier that is different from a carrier for interference measurement (hereinafter, referred to as a measurement carrier). The first base station 110 may transmit a handover command to each of the RRC-connected terminals. For example, the first base station 110 may transmit a handover command to the terminal 140 of FIG. 1A. The terminal 140 may be handed over to a carrier different from the measurement carrier. In one embodiment, the carrier to which the terminal handovers may be a carrier determined to not cause interference above the threshold with the measurement carrier.

Also, the first base station 110 may forcibly disconnect the RRC-connected terminals from the first base station 110. The first base station 110 may transmit an RRC connection release message to the terminals. In some embodiments, the first base station 110 may forcibly prevent the RRC-connected terminals according to the operation of a timer. There may be a terminal that remains connected to the first base station 110 even after the first base station 110 transmits the handover command. The first base station 110 may operate the timer to collectively release the RRC connection of remaining terminals upon the expiration of the timer.

The first base station 110 may also be controlled to perform UL prevention signaling with respect to interfering candidate base stations (e.g., the second base station 120 and the third base station 130 of FIG. 1A) in order to prevent new UL transmission during a UL subframe for measurement, because even a UL signal of a terminal in the coverage of each of the interfering candidate base stations may be introduced and may act as an interference signal in the UL subframe duration of the first base station 110. Such an interference signal may hinder accurate TOF interference measurement. In some embodiments, the configuration of interfering candidate base stations may be determined according to the distance from the first base station 110. For example, when the TOF interference distance set by a user is 180 km, base stations located within 180 km from the first base station 110 may be included in the interfering candidate base stations.

When the EMS 180 is configured as an entity separate from the first base station 110, the EMS 180 may control not only the first base station 110 but also all interfering candidate base stations, which are expected to give TOF interference, to perform UL prevention signaling. For example, the triggering message described above may include information that causes the UL prevention signaling. Accordingly, a base station receiving the triggering message may perform UL prevention signaling.

The first base station 110 and other base stations (e.g., the second base station 120 and the third base station 130) may prevent in advance a UL signal, which may be transmitted from any terminal, through the cell barring operation, the forced handover operation, and the forced RRC connection release operation.

The first base station 110 may perform the UL prevention signaling while maintaining the set configuration of an SSF. The first base station 110 may perform the UL prevention signaling without performing a separate SSF operation. In some embodiments, the first base station 110 may set the SSF configuration to a first SSF configuration. Here, the first SSF configuration may be an SSF configuration for the other base stations. That is, the first base station 110 may match the SSF configuration with that for the interfering candidate base stations (e.g., the second base station 120 and the third base station 130 of FIG. 1A) in order to measure TOF interference during a UL subframe for measurement. In the case of different SSF configurations, it is difficult to measure accurate TOF interference because of the different boundaries of UL subframes. The first base station 110 may set the first SSF configuration. The interfering candidate base stations may also set an SSF configuration to the first SSF configuration under the control of the first base station 110 or the EMS 180. As the SSF configurations of the base stations match, accurate TOF interference may be measured. For example, the first SSF configuration may be a configuration in which DwPTS as a DL portion is relatively long. For example, the first SSF configuration may be SSF configuration #7 in Table 2. Here, the first SSF configuration may be referred to as a reference SSF configuration.

In operation 320, the first base station 110 may measure the strength of a DL signal received from at least one base station during at least one symbol duration in a UL subframe.

The DL signal may be a signal artificially generated from the at least one base station. The at least one base station may be one of the interfering candidate base stations. Through operation 310, there may be no terminal RRC-connected to the at least one base station. Accordingly, the first base station 110 may control the at least one base station to artificially generate a DL signal in order to measure TOF interference. The DL signal may include dummy data. The dummy data may not be data on traffic to be actually transmitted but may mean data for measuring interference. In some embodiments, each base station may be preconfigured to generate a DL signal upon transmission of a triggering message. Accordingly, even though there is no actual DL traffic, the at least one base station may perform PDSCH transmission. For example, the at least one base station may generate the DL signal through an orthogonal downlink noise simulator (OCNS). When the EMS 180 is not included in the first base station 110, the EMS 180 may directly, instead of the first base station 110, control other interfering candidate base stations, other than the first base station 110 as a measuring base station, to generate a DL signal in order to generate TOF interference. In this case, each base station may also be preconfigured to generate a DL signal upon transmission of a triggering message for the measurement operation.

In some embodiments, the DL signal may be artificially generated according to designated physical resource block (PRB) usage. In some embodiments, the dummy data is generated according to a predetermined load level. For example, when the designated PRB usage is 20%, each of the base stations receiving control signaling from the first base station 110 or the EMS 180 may generate and transmit a DL signal with a 20% load ratio.

In some other embodiments, the DL signal may be artificially generated according to the PRB rate per base station according to the statistical result. For example, when estimated PRB usage in the second base station 120 is '3' and estimated PRB usage in the third base station 130 is '1', the load ratio between a first DL signal generated and transmitted by the second base station 120 and a second DL signal generated and transmitted by the third base station 130 may be 3 to 1. As such, the load of a DL signal of each of the at least one base station may be determined on the basis of the estimated PRB usage so that a measurement environment is similar to an actual communication environment. Each of the base stations receiving control signaling from the first base station 110 or the EMS 180 may determine a load for a DL signal to be artificially generated on the basis of PRB usage statistics information stored in a corresponding base station. In other words, the dummy data is generated according to a load level determined based on a resource usage measured at each of at least one base station (i.e., the second base station 120, the third base station 130).

A DL signal generated from each of the interfering candidate base stations may be received overlappingly in an SSF immediately before a UL subframe to be measured. The first base station 110 may measure TOF interference for the received overlapping signal. Here, since there is neither a DL signal transmitted from the first base station 110 nor a UL signal transmitted from a terminal in the serving cell of the first base station 110, measured reception strength may entirely indicate interference.

The first base station 110 may measure TOF interference per symbol in a UL subframe. The first base station 110 may measure TOF interference from a specific distance. For example, one symbol may correspond to a distance of 20 km. When SSF configuration #7 in Table 2 is set up, the first base station 110 may measure signal strength on the first symbol of a UL subframe, thereby measuring TOF interference from a distance of about 90 to 110 km. Here, a strength parameter of a measured signal may be a parameter related to the reception strength of a signal. For example, the parameter may be reference signal received power (RSRP), reference signal received quality (RSRQ), or a received signal strength indicator (RSSI). Alternatively, the strength parameter of the measured signal may be a parameter related to the quality of a signal. For example, the parameter may be signal-to-interference and noise ratio (SINR), carrier-to-interference and noise ratio (CINR), or signal-to-noise ratio (SNR).

Although not shown in FIG. 3, the first base station 110 may store the measurement result. The first base station 110 may measure a received DL signal per symbol and may store the measurement result in a distinguished manner such that in which symbol of a subframe and how strong the DL signal is measured. An operation of storing measured results in each subframe on a symbol basis may be referred to as a statistical operation. Here, a symbol may correspond to a distance from the first base station 110. In FIG. 3, operation 310 is followed by operation 320. However, the disclosure is not limited thereto. That is, UL prevention signaling may be performed during the measurement operation.

Although the above description has been described on the basis that the transmission of UL signal is prevented from all terminals, but the present disclosure is not limited thereto. The objects of the prevention can be distinguished in a carrier.

In some embodiments, the UL signal to be prevented may refer to a UL signal corresponding to a carrier to be measured. The first station 110 can perform signaling to prevent UL signal only corresponding to carrier to be measured instead of all carriers.

In some embodiments, in consideration of inter-carrier interference (ICI), the base station may perform UL prevent signaling to prevent adjacent carriers as well as the carrier to be measured In some embodiments, the prevention of transmission of the UL singles corresponding to all carriers served by the first base station 110 is also included in the embodiment of the present disclosure.

FIG. 3 shows a presetting operation for measuring TOF interference, a TOF interference measurement operation, and a measurement result processing operation in the order of flow. Hereinafter, FIG. 4 shows specific operations, for example, for measuring TOF interference.

Figure 4:
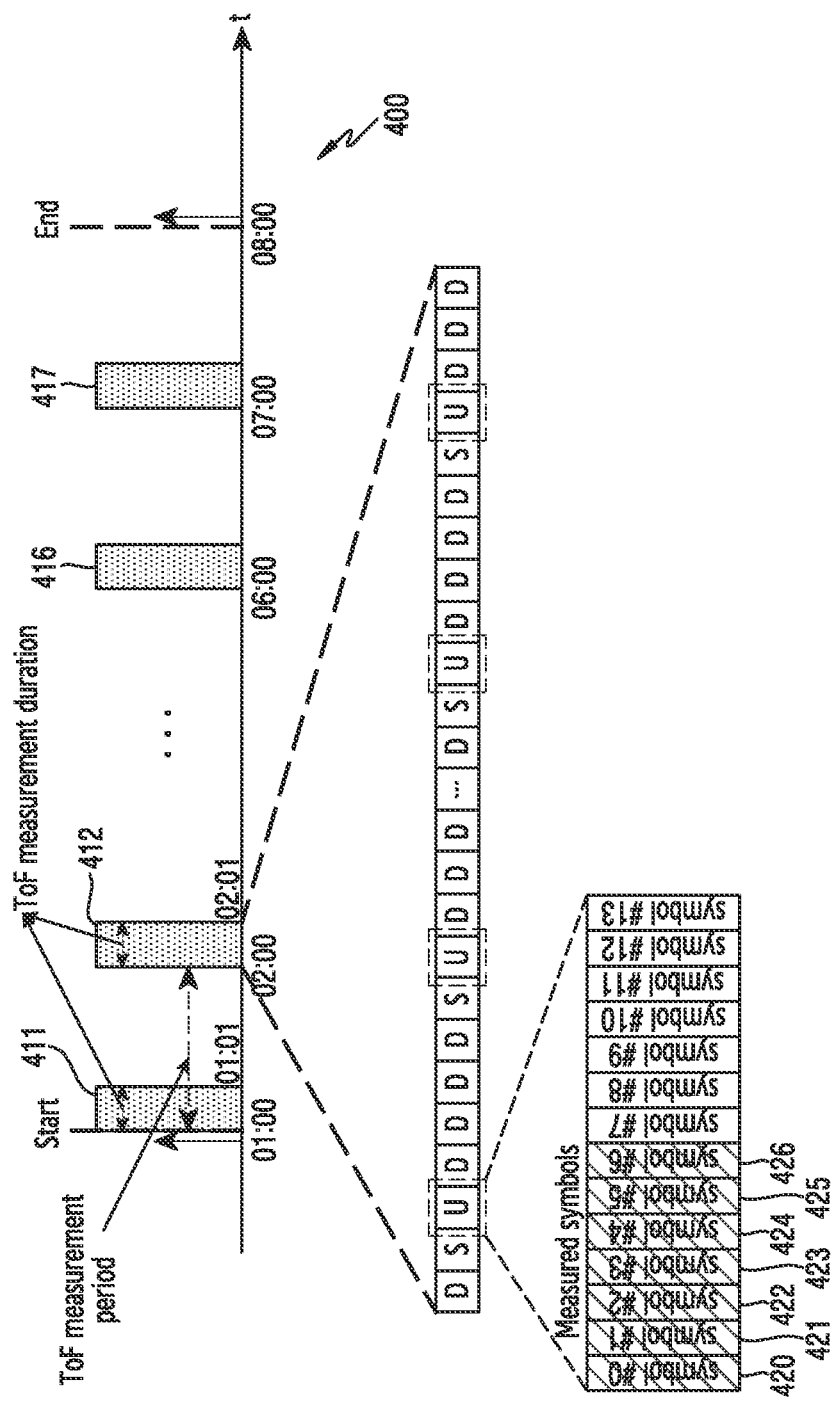
FIG. 4 illustrates an example of interference measurement in a wireless communication system according to various embodiments of the disclosure.

FIG. 4 illustrates an example of interference measurement according to various embodiments of the disclosure. The situation in which the first base station 110 of FIG. 1A measures TOF interference is illustrated by way of example.

Referring to FIG. 4, a graph 400 illustrates a measurement procedure over time. A horizontal axis of the graph 400 denotes time. A window for performing the measurement procedure is defined. Here, the window may be referred to as a diagnosis window or a measurement window. In the description of the disclosure, the window is referred to as a measurement window. For example, the measurement window may be set from 01:00 to 08:00. The first base station 110 may perform a measurement operation during an interval in which the measurement window is set.

The first base station 110 may perform measurement every measurement period. For example, the measurement period may be one hour. The first base station 110 may repeatedly perform the measurement operation exactly at one o'clock, two o'clock, . . . , seven o'clock. The first base station 110 may periodically measure interference in a UL subframe. The measurement period may be included in a triggering message or may be a preset value.

The first base station 110 may perform measurement every measurement duration within the measurement period. For example, the measurement duration may be one minute. The first base station 110 may perform measurement in a first measurement duration 411 (from 1:00 to 1:01), in a second measurement duration 412 (from 2:00 to 2:01), . . . , in a sixth measurement duration 416 (from 6:00 to 6:01), and in a seventh measurement duration 417 (from 7:00 to 7:01).

The first base station 110 may perform measurement every UL subframe included in each measurement duration. The first base station 110 may perform measurement for each of UL subframes included in each of a plurality of frames included in one minute, that is, 60 seconds. For example, the first base station 110 may perform measurement for each of UL subframes included in 6,000 frames included in the second measurement duration 412 (1 minute).

The first base station 110 may perform measurement on at least one symbol included in a UL subframe. The first base station 110 may measure the strength of a DL signal on at least one symbol among a plurality of symbols included in one subframe according to a preset threshold value. For example, in the LTE-TDD system, the first base station 110 may measure the strength of a DL signal on seven symbols (symbol #0 420, symbol #1 421, symbol #2 422, symbol #3 423, symbol #4 424, symbol #5 425, and symbol #6 426) among 14 symbols.

The first base station 110 may adaptively adjust the number of the at least one symbol according to the degree of TOF interference to be measured and the distance between an interfering candidate base station and a measuring base station. Since the number of the at least one symbol may provide various options based on statistical information according to the measurement result, a relatively large number of symbols to be measured are advantageous for control of TOF interference by distance. On the other hand, since a base station over a certain distance is less influenced by TOF interference, measuring and storing the reception strength of DL signals during a great number of symbol intervals may cause overheads. Therefore, the first base station 110 is required to adaptively adjust the number of the at least one symbol in consideration of overheads and availability of statistical information.

The first base station 110 may terminate the interference measurement procedure when the measurement window expires. The first base station 110 may generate and broadcast system information including information indicating that cell access is possible, instead of system information set to prevent access of a new terminal. Further, when the interference measurement procedure is terminated, artificial DL cell loading may be stopped. The first base station 110 may perform control signaling to all other interfering candidate base stations to stop the transmission of a DL signal. When the EMS 180 is configured separately from the first base station 110, the EMS 180 may perform control signaling to all other interfering candidate base stations to stop the generation and transmission of a DL signal.

FIGS. 3 and 4 illustrate an operation of measuring TOF interference between remote cells due to a propagation delay. Hereinafter, FIGS. 5 and 6 illustrate specific operations of TOF interference control based on the measured result.

TOF Interference Control

Figure 5:
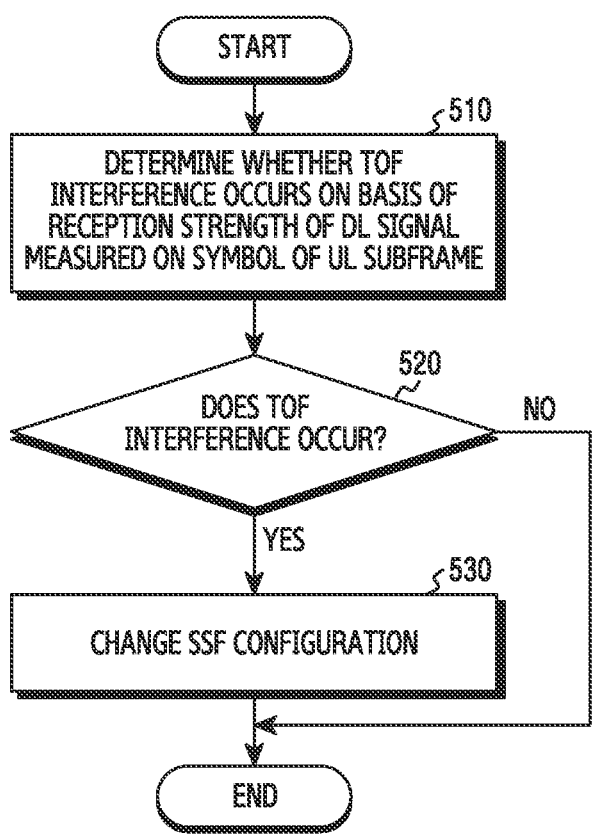
FIG. 5 illustrates the flow of an interference control operation by a base station in a wireless communication system according to various embodiments of the disclosure.
Figure 6:
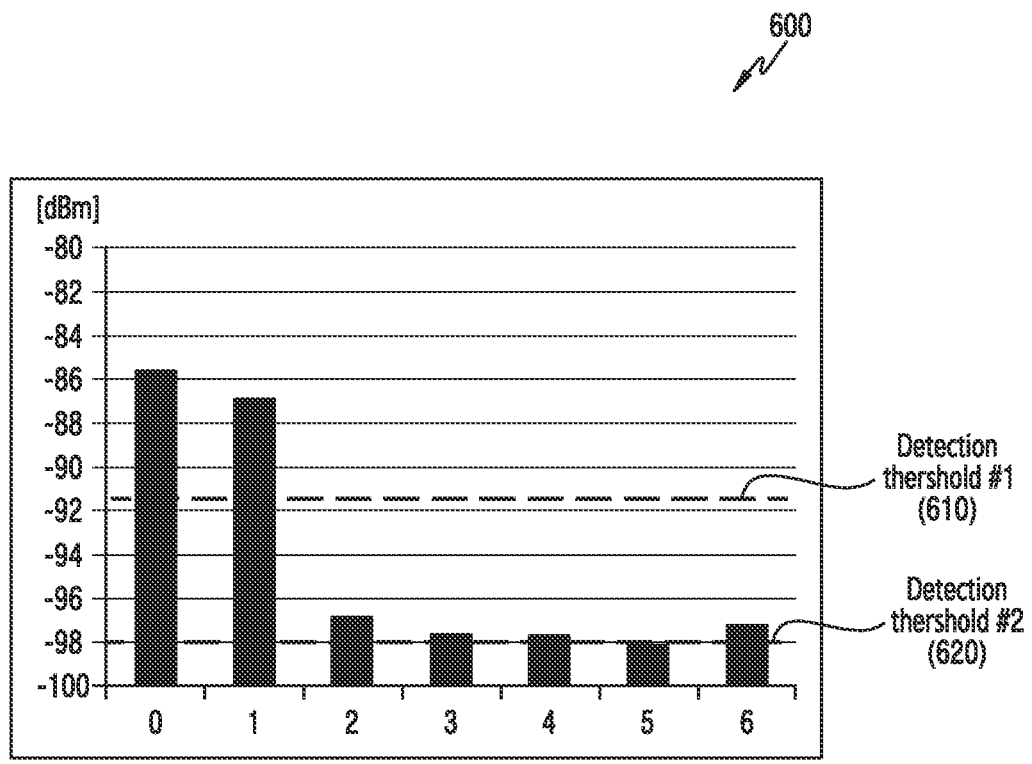
FIG. 6 illustrates an example of a result of measuring another base station in a wireless communication system according to various embodiments of the disclosure.

FIG. 5 illustrates the flow of an interference control operation by a base station according to various embodiments of the disclosure. The base station may be the first base station 110 of FIG. 1A.

Referring to FIG. 5, in operation 510, the first base station 110 may determine whether TOF interference occurs on the basis of the strength of a DL signal measured on a symbol of a UL subframe. That is, the first base station 110 may determine whether interference occurs due to a DL signal transmitted from at least one base station remote from the first base station 110. Here, whether TOF interference occurs may mean whether TOF interference is controlled according to the measured strength of a signal, not whether an interference signal actually exists. The first base station 110 may obtain the reception strength value (e.g., RSSI) of a DL signal by at least one symbol, which is measured in a UL subframe, through the TOF interference measurement procedure illustrated in FIGS. 3 and 4. Subsequently, the first base station 110 may determine whether TOF interference occurs on the basis of the reception strength value of the downlink signal per symbol.

In some embodiments, the first base station 110 may determine whether TOF interference occurs depending on whether the reception strength value of a particular symbol (UL symbol) is equal to or greater than a threshold value. Here, the position of the particular symbol may correspond to the distance between the first base station 110 and an interfering candidate base station. That is, the particular symbol may be determined on the basis of the distance to an interfering source to be detected. For example, when a reference SSF configuration is SSF configuration #7 and it is intended to control TOF interference from a base station located about 90 km to 110 km away, the first base station 110 may determine whether the RSSI of the first symbol is equal to or greater than the threshold value, thereby determining whether TOF interference occurs. In another example, when the reference SSF configuration is SSF configuration #7 and it is intended to control TOF interference from a base station located at about 110 km to 130 km away, the first base station 110 may determine whether the RSSI of the second symbol is equal to or greater than the threshold value, thereby determining whether TOF interference occurs. In still another example, when the reference SSF configuration is SSF configuration #7 and it is intended to control TOF interference from a base station located about 130 km to 150 km away, the first base station 110 may determine whether the RSSI of the third symbol is equal to or greater than the threshold value, thereby determining whether TOF interference occurs.

When a symbol at a particular position has a value equal to or greater than the threshold value, the first base station 110 may determine that TOF interference occurs from a base station corresponding to the particular position. On the contrary, when the symbol at the particular position has a value below the threshold value, the first base station 110 may determine that TOF interference does not occur.

In some other embodiments, the first base station 110 may determine whether TOF interference occurs depending on whether the number of symbols, on which the reception strength value is measured to be equal to or greater than a detection threshold value, is equal to or greater than a threshold symbol number. A large number of symbols on which the reception strength value is measured greater than the detection threshold value means that there is a high likelihood that the signal is intactly transmitted and thus acts as interference to the first base station 110. A graph 600 illustrated in FIG. 6 shows an example of a measurement result by the first base station 110. A horizontal axis sequentially denotes measured symbols, and a vertical axis denotes RSSI. Here, a detection threshold value or a threshold symbol number may be determined by a user who manages TOF interference. The user may determine the detection threshold value or the threshold symbol number depending on the degree to which the user desires to control TOF interference. The user may adjust the control degree of TOF interference by adjusting the detection threshold value or the threshold symbol number. For example, the detection threshold value may be a first threshold value 610 (e.g., −91 dBm), and the threshold symbol number may be three. In this case, since only the first symbol and the second symbol exceed the first threshold value 610, the first base station 110 may determine that no TOF interference occurs to the first base station 110. Further, the detection threshold value may be a second threshold value 620 (e.g., −98 dBm), and the threshold symbol number may be three. In this case, since six symbols exceed the second threshold value 620, the first base station 110 may determine that TOF interference occurs to the first base station 110.

In operation 520, when the first base station 110 determines that TOF interference occurs, the first base station 110 may perform operation 530. On the other hand, when the first base station 110 determines that TOF interference does not occur, the first base station 110 may terminate the TOF interference management operation in a corresponding measurement period.

In operation 530, when the first base station 110 determines that TOF interference has occurred, the first base station 110 may change the SSF configuration. When signals received by the first base station 110 from interfering candidate base stations act as TOF interference, the first base station 110 may operate to control the generated TOF interference. The first base station 110 may change the SSF configuration to alleviate the TOF interference. The first base station 110 may change the SSF configuration set for the first base station 110 from the reference SSF configuration to a second SSF configuration, where the second SSF configuration may be referred to as a target SSF configuration. The second SSF configuration may have a shorter DwPTS than the reference SSF configuration. In order to apply the changed SSF configuration, cell release and cell setup procedures may be required.

In some embodiments, the first base station 110 may change an SSF configuration for the at least one base station to prevent a DL signal received from an interfering candidate base station from being introduced into a UL subframe. The first base station 110 may determine an SSF configuration having a long GP as a target SSF configuration. Also, when EMS 180 is configured separately, the first base station 110 may transmit information indicating the target SSF configuration via the EMS 180, or the EMS 180 may directly transmit signaling that indicates a change in SSF configuration to each of the at least one base station. In some other embodiments, the SSF configuration of the first base station 110 may be changed in order to minimize the effect of introduction of DL signals received from an interfering candidate base station into a UL subframe. The first base station 110 may determine an SSF configuration in which a UpPTS starts later, that is, an SSF configuration with a short UpPTS, as a target SSF configuration.

In a TDD system, channel reciprocity may be used on the assumption that a UL channel and a DL channel are the same in the same frequency band. As the first base station 110 measures TOF interference from the at least one base station, that is, the interfering candidate base station, the first base station 110 may be an aggressor cell, which causes interference to the interfering candidate base station when considering channel reciprocity. The first base station 110 may select an SSF configuration having a short DwPTS in an SSF in order to minimize the occurrence of interference. For example, the first base station 110 may change the SSF configuration from SSF configuration #7 having a DwPTS length of 9 to SSF configuration #5 having a DwPTS length of 3. The first base station 110 may change the SSF configuration from an SSF configuration having a shorter DwPTS, thereby reducing the probability that the first base station 110 acts as an aggressor cell to other base stations in DL transmission through the DwPTS. In addition, when TOF interference occurs, the first base station 110 may not perform test transmission to all cells but may determine whether a measuring base station is an aggressor cell using channel reciprocity, thereby reducing overheads for finding an aggressor cell of TOF interference.

FIG. 5 shows that the first base station 110, which is a measuring base station, changes the SSF configuration, but a measurement subject and a control subject may be different. In some embodiments, when the EMS 180 is configured separately from the first base station 110, the EMS 180 may determine the SSF configuration to be changed. The EMS 180 may receive a measurement result from each of measuring base stations that measure TOF interference and may determine the SSF configuration to be changed (target SSF configuration) on the basis of the measurement result. The EMS 180 may transmit SSF notification information indicating the target SSF configuration to a base station that changes an SSF. The base station receiving the SSF notification information may change the SSF configuration of the TDD system from the reference SSF configuration to the target SSF configuration, may allocate resources according to the changed SSF configuration, and may use the allocated resources for RF transmission and reception.

Further, a measurement period and a control period may be set differently. For example, the first base station 110 may perform measurement every hour, from 1 am to 8 am every day, while the control period may be set to a longer term. The first base station 110 may determine TOF interference (operations 510 and 520) from statistical information measured weekly or monthly on the basis of statistical information of the measurement results, and may perform an operation of controlling the TOF interference (operation 530).

Although not shown in FIG. 5, other interference control procedures may be performed in addition to an operation of changing the SSF configuration of an aggressor cell. In some embodiments, when the first base station 110 is determined as an aggressor cell, the first base station 110 may reduce power for DL transmission. As the power for DL transmission is reduced, the impact of interference on distant cells due to DL transmission by the first base station 110 may be reduced.

Figure 7:
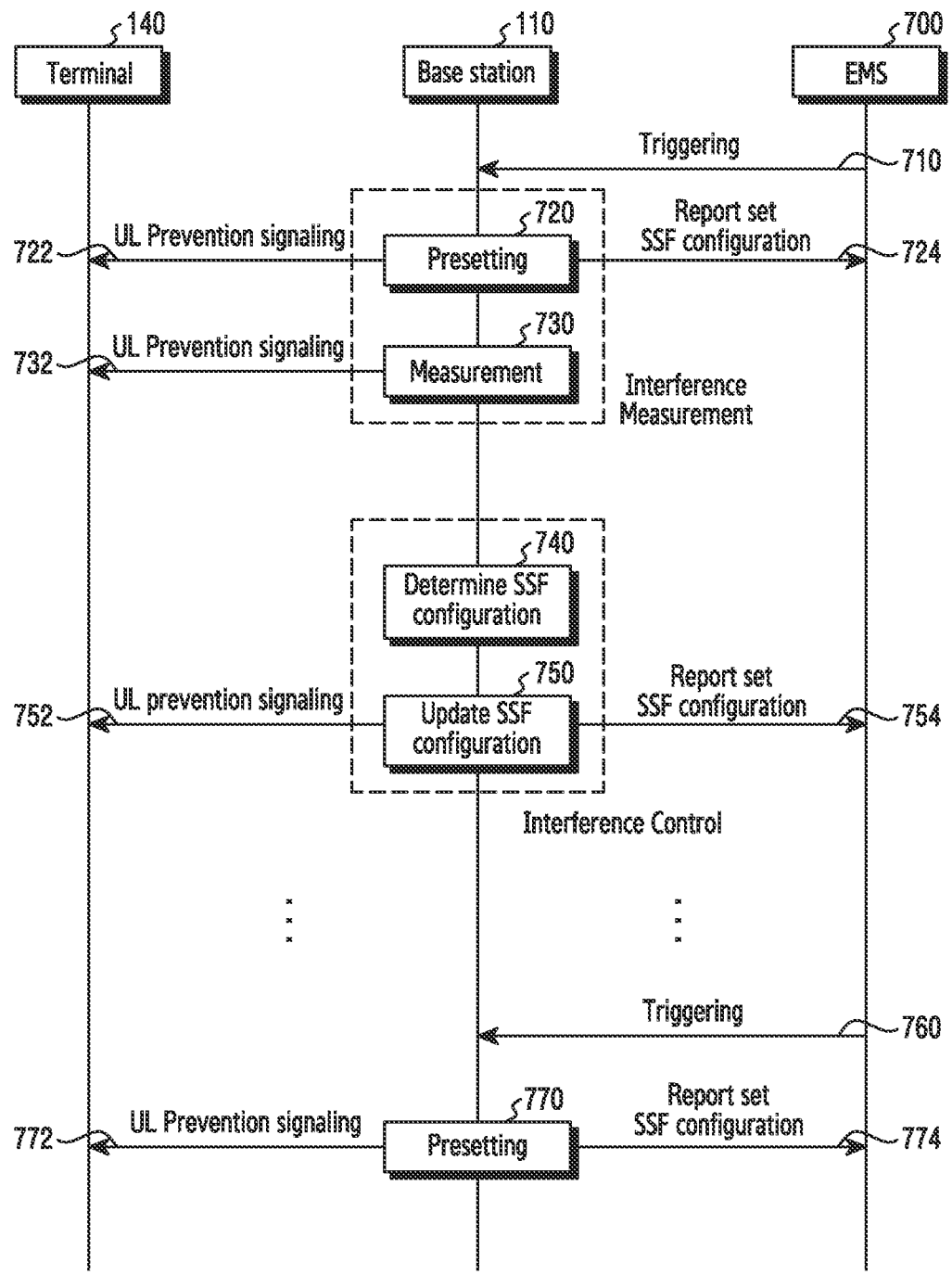
FIG. 7 illustrates signal flow for interference management in a wireless communication system according to various embodiments of the disclosure.

FIGS. 3 to 6 show an operation of measuring TOF interference by a measuring base station (or measuring cell) and an operation of controlling measured interference by the measuring base station. FIG. 7 illustrates signaling for measurement between network entities, such as a base station, a terminal, and an EMS.

FIG. 7 illustrates signal flow for interference management according to various embodiments of the disclosure. An interference management procedure may also be referred to as automatic long-distance interference detection and mitigation (ALDM). In FIG. 7, unlike in FIGS. 2 to 6, an EMS is configured as a separate device from a base station and performs signaling as an independent network entity.

Referring to FIG. 7, in operation 710, the EMS 700 may transmit a triggering message to a first base station 110. The triggering message may include information on parameter setting. The parameter setting refers to an operation of setting parameter values required for a presetting operation for measuring TOF interference. The set parameters may include information on a reference SSF configuration to be set by all of the first base station 110 and other interfering candidate base stations. Here, the reference SSF configuration may have a relatively longer DwPTS than other SSF configurations. For example, the reference SSF configuration may be SSF configuration #7 in Table 2. Further, the parameters may include information indicating that all of the first base station 110 and other interfering candidate base stations are required to perform UL prevention signaling. For example, the parameters may include a parameter for controlling a particular cell to be designated as a barred cell, a parameter for controlling a forced handover from a particular cell to another cell, or a parameter for indicating an operation of a timer for RRC connection release.

In operation 720, the first base station 110 may perform presetting. The first base station 110 may set an SSF configuration to the reference SSF configuration according to the parameter setting information received in operation 710. If necessary, the first base station 110 may report the set SSF configuration to the EMS 700 (724). That is, operation 724 may be omitted.

The first base station 110 may perform UL prevention signaling to prevent transmission of a new UL signal. Specifically, the first base station 110 may generate and broadcast system information for barring connection to a cell of the first base station 110 so that a new terminal is not connected to the first base station 110. Also, the first base station 110 may transmit a handover command to all terminals currently RRC-connected so that there is no terminal connected to the serving cell of the first base station 110. The terminals may be handed over to another cell (another carrier frequency) of the first base station 110 or may be handed over to another base station. In addition, when the timer expires (e.g., 5 seconds), the first base station 110 may transmit an RRC connection release message to all terminals connected to the serving cell of the first base station 110. Although FIG. 7 shows that UL prevention signaling is performed in operation 722 in addition to the presetting operation, UL prevention signaling may be performed at any time during TOF interference measurement. That is, even though not being performed in operation 722, UL prevention signaling may be performed in operation 732 or 752 or may be manually performed by a network operator.

Although not shown in FIG. 7, both the first base station 110 and all the interfering candidate base stations perform a preset operation according to the parameter setting information received from the EMS 700.

In operation 730, the first base station 110 may measure TOF interference. TOF interference refers to interference that occurs as a DL signal is introduced into a symbol of a UL subframe for a serving cell due to the propagation delay of the DL signal transmitted from a distant cell. The first base station 110 may measure interference in a UL subframe. According to various embodiments, the UL subframe comprises a subframe following a special subframe in one frame.

The first base station 110 may perform measurement on all UL subframes for measurement duration. For example, when the measurement duration is 60 seconds and the UL/DL configuration of a TDD system is UL/DL configuration #5, the first base station 110 may perform measurement on symbols in 6000 UL subframes included in 6000 frames. In some embodiments of the disclosure, the first base station 110 may be controlled to perform measurement only on some UL subframes, in view of overheads, for the measurement duration.

The first base station 110 may measure the strength of a DL signal received from each of at least one symbol (e.g., symbol #0 420 to symbol #6 426 in FIG. 4) among a plurality of symbols (e.g., 14 symbols) included in a UL subframe. Here, the DL signal may be a signal transmitted from at least one interfering candidate base station. As a parameter for measuring the strength of a signal, RSSI, RSRP, or RSRQ may be used.

Although not shown in FIG. 7, the EMS 700 may control all interfering candidate base stations, other than the first base station 110 as a measuring base station, to artificially generate a DL signal. Here, each interfering candidate base station may generate a DL signal according to designated PRB usage or may generate a DL signal according to an amount estimated on the basis of PRB usage statistics estimated for each interfering candidate base station. When there are two or more interfering candidate base stations, the first base station 110 may receive overlapping signals in one UL subframe.

In operation 740, the first base station 110 may determine a target SSF configuration. The first base station 110 may obtain a reception signal strength value per symbol on the basis of TOF interference measured in operation 730. The first base station 110 may determine whether TOF interference occurs on the basis of the reception signal strength value per symbol. Here, whether TOF interference occurs means whether a control operation is performed according to the degree of measured TOF interference, not whether an interference signal actually exists. In some embodiments of the disclosure, the first base station 110 may compare a reception signal strength value at the position of a particular symbol in a UL subframe with a preset threshold value, depending on the desired extent to which TOF interference is controlled. The threshold value may be a threshold value for signal strength. For example, in SSF configuration #7, when the RSSI of the second symbol in a UL subframe following a special subframe exceeds the threshold value, the first base station 110 may determine that TOF interference occurs from a base station located 110 km to 130 km away.

In some other embodiments, the first base station 110 may compare the number of symbols, on which a reception signal strength value is measured to be equal to or greater than a detection threshold value, among symbols in a UL subframe with a threshold symbol number depending on the degree to which TOF interference is desired to be controlled. The detection threshold value or the threshold symbol number may be manually controlled by a network operator controlling the statistics, a user of the EMS 700, or a separate manager. When the occurrence of TOF interference is frequently observed based on the statistical result according to the measurement result in operation 730, the detection threshold value or the threshold symbol number may be set to a low value.

When it is determined that TOF interference occurs, the first base station 110 may control the generated TOF interference. The first base station 110 may determine a target SSF configuration to alleviate TOF interference. In some embodiments, the first base station 110 may change the SSF configuration of the interfering candidate base stations such that the length of a GP is increased or may change the SSF configuration of the first base station 110 such that the length of a UpPTS is increased. The first base station 110 may be a victim cell receiving TOF interference, while the first base station 110 may act as an aggressor cell to other interfering candidate base stations depending on channel reciprocity. Thus, in some other embodiments, the first base station 110 may change the SSF configuration of the first base station 110 such that the length of a DwPTS is reduced (or minimized). Using channel reciprocity, the first base station 110 can control interference with overheads reduced, without performing test transmission for finding an aggressor cell to all cells.

In operation 750, the first base station 110 may update the target SSF configuration. The first base station 110 may update the SSF configuration from the reference SSF configuration established according to presetting to the target SSF configuration determined in operation 740. The first base station 110 may report the updated SSF configuration to the EMS 700 as needed (operation 754).

Although not shown in FIG. 7, when changing the SSF configuration of other interfering candidate base stations, the first base station or the EMS 700 may report an SSF configuration to be changed (target SSF configuration) to each of the other interfering candidate base stations.

In operation 760, the EMS 700 may transmit a triggering message to the first base station 110. The EMS 700 may operate in a similar manner to operation 710. The EMS 700 may periodically transmit the triggering message according to the measurement period set by the user. A time period between operations 710 and 760 may be the measurement period. For example, the measurement period may be the measurement period in FIG. 4. The measurement period may be one hour. The first base station 110 may maintain the SSF configuration set in operations 710 to 750 for one hour.

Thereafter, operations 770, 772, and 774 may be performed in a similar manner to operations 720, 722, and 724 described above. The subsequent operations are periodically repeated signaling.

When the EMS 700 is included in the first base station 110, operations 710, 754, 760, and 774 may be omitted. However, the above-described signal exchange procedures performed by the EMS 700 with other base stations (e.g., the second base station 120 and the third base station 130) than the first base station 110 may not be omitted. These procedures may be performed directly by the first base station 110 via a communication interface (e.g., X2 interface) instead of the EMS 700.

A TOF interference management method for measuring interference between distant cells due to a propagation delay, that is, TOF interference, and for controlling generated interference in a TDD-based communication system has been described with reference to FIGS. 1A to 7. According to the disclosure, an operator may measure the occurrence of TOF interference and may control a base station or an EMS according to a desired measurement schedule, thereby adaptively dealing with TOF interference by time zone or season.

Although the expression "equal to or greater than (or exceeding)" or "less than or equal to (or below)" is used in the disclosure to determine whether a particular condition is fulfilled, such expressions are used merely for illustrative purposes and are not intended to exclude the expression "exceeding (or equal to or greater than)" or "below (or less than or equal to)." For example, "equal to or greater than" stated in a condition may be replaced with "exceeding"; "less than or equal to" stated in a condition may be replaced with "below"; "exceeding" stated in a condition may be replaced with "equal to or greater than"; "below" stated in a condition may be replaced with "less than or equal to"; "equal to or greater than and below" stated in a condition may be replaced with "exceeding and less than or equal to"; and "exceeding and less than or equal to" stated in a condition may be replaced with "equal to or greater than and below."

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of these may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments of the disclosure, it will be understood by those skilled in the art that various changes in form and details may be made therein without departing from the spirit and scope of the disclosure as defined by the appended claims and their equivalents.

What is claimed is:

1. A method performed by a first base station in a wireless communication system supporting time division duplex (TDD), the method comprising:
    configuring a first configuration including uplink (UL)-downlink (DL) patterns, wherein the UL-DL patterns sequentially comprise a DL period, a guard period (GP) between the DL period and a UL period, and the UL period; and
    receiving, from a second base station, a notification signal indicating that remote interference occurs in the UL period by a DL signal transmitted from the first base station in the DL period,
    wherein the notification signal is provided based on a measurement result obtained by the second base station during at least one symbol period of the UL period.

2. The method of claim 1, further comprising:
    transmitting a signal based on a result of the notification via a backhaul between the first base station and the second base station.

3. The method of claim 1,
    wherein the first base station is associated with an aggressor cell, and the second base station is associated with a victim cell, and
    wherein the second base station is configured with a second configuration including the same UL-DL patterns as the UL-DL patterns included in the first configuration of the first base station.

4. The method of claim 1, wherein a number of UL symbols associated with the remote interference is based on a distance between the first base station and the second base station.

5. A method performed by a second base station in a wireless communication system supporting time division duplex (TDD), the method comprising:
    configuring a first configuration including uplink (UL)-downlink (DL) patterns, wherein the UL-DL patterns sequentially comprise a DL period, a guard period (GP) between the DL period and a UL period, and the UL period;
    obtaining a measurement result during at least one symbol period of the UL period; and
    transmitting a notification signal indicating that remote interference occurs in the UL period by the DL signal transmitted from a first base station in the DL period, wherein the notification signal is provided based on the measurement result.

6. The method of claim 5, wherein the first base station is associated with an aggressor cell, and the second base station is associated with a victim cell.

7. The method of claim 5, wherein the first base station is configured with a second configuration including the same UL-DL patterns as the UL-DL patterns included in the first configuration of the second base station.

8. The method of claim 5, wherein a number of UL symbols associated with the remote interference is based on a distance between the first base station and the second base station.

9. A first base station in a wireless communication system supporting time division duplex (TDD), the first base station comprising:
   a transceiver; and
   a processor coupled with the transceiver; and
   memory storing instructions that, when executed by the processor, cause the first base station to:
   configure a first configuration including uplink (UL)-downlink (DL) patterns, wherein the UL-DL patterns sequentially comprise a DL period, a guard period (GP) between the DL period and a UL period, and the UL period, and
   receive, from a second base station, a notification signal indicating that remote interference occurs in the UL period by a DL signal transmitted from the first base station in the DL period,
   wherein the notification signal is provided based on a measurement result obtained by the second base station during at least one symbol period of the UL period.

10. The first base station of claim 9, wherein the instructions, when executed by the processor, cause the first base station to transmit a signal based on a result of the notification via a backhaul between the first base station and the second base station.

11. The first base station of claim 9,
   wherein the first base station is associated with an aggressor cell, and the second base station is associated with a victim cell, and
   wherein the second base station is configured with a second configuration including the same UL-DL patterns as the UL-DL patterns included in the first configuration of the first base station.

12. The first base station of claim 9, wherein a number of UL symbols associated with the remote interference is based on a distance between the first base station and the second base station.

13. A second base station in a wireless communication system supporting time division duplex (TDD), the second base station comprising:
   a transceiver; and
   a processor coupled with the transceiver; and
   memory storing instructions that, when executed by the processor, cause the second base station to:
   configure a first configuration including uplink (UL)-downlink (DL) patterns, wherein the UL-DL patterns sequentially comprise a DL period, a guard period (GP) between the DL period and a UL period, and the UL period,
   obtain a measurement result during at least one symbol period of the UL period, and
   transmit a notification signal indicating that remote interference occurs in the UL period by the DL signal transmitted from the first base station in the DL period,
   wherein the notification signal is provided based on the measurement result.

14. The second base station of claim 13, wherein the first base station is associated with an aggressor cell, and the second base station is associated with a victim cell.

15. The second base station of claim 13, wherein the first base station is configured with a second configuration including the same UL-DL patterns as the UL-DL patterns included in the first configuration of the second base station.

16. The second base station of claim 13, wherein a number of UL symbols related to the remote interference is based on a distance between the first base station and the second base station.

17. One or more non-transitory computer-readable storage media storing one or more programs including instructions that, when executed by one or more processors of a first base station, cause the first base station to perform operations, the operations comprising:
   configuring a first configuration including uplink (UL)-downlink (DL) patterns, wherein the UL-DL patterns sequentially comprise a DL period, a guard period (GP) between the DL period and a UL period, and the UL period; and
   receiving, from a second base station, a notification signal indicating that remote interference occurs in the UL period by a DL signal transmitted from the first base station in the DL period,
   wherein the notification signal is received, based on a measurement result obtained by the second base station during at least one symbol period of the UL period.

18. The one or more non-transitory computer-readable recording media of claim 17,
   wherein the second base station is configured with a second configuration including the same UL-DL patterns as the UL-DL patterns included in the first configuration of the first base station.

19. One or more non-transitory computer-readable storage media storing one or more programs including instructions that, when executed by one or more processors of a second base station, cause the second base station to perform operations, the operations comprising:
   configuring a first configuration including uplink (UL)-downlink (DL) patterns, wherein the UL-DL patterns sequentially comprise a DL period, a guard period (GP) between the DL period and a UL period, and the UL period;
   obtaining a measurement result during at least one symbol period of the UL period; and
   transmitting, to a first base station, a notification signal indicating that remote interference occurs in the UL period by the DL signal transmitted from the first base station in the DL period,
   wherein the notification signal is transmitted based on the measurement result.

20. The one or more non-transitory computer-readable storage media of claim 19,
   wherein the first base station is configured with a second configuration including the same UL-DL patterns as the UL-DL patterns included in the first configuration of the second base station.

* * * * *